United States Patent
Chrabascz et al.

(10) Patent No.: US 10,252,805 B2
(45) Date of Patent: Apr. 9, 2019

(54) FLOW DUCT FOR A RAM OUTLET HEADER

(71) Applicant: Hamilton Sundstrand Corporation, Windsor Locks, CT (US)

(72) Inventors: Eric Chrabascz, Longmeadow, MA (US); Ronald J. Courtemanche, Windsor Locks, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 607 days.

(21) Appl. No.: 14/988,922

(22) Filed: Jan. 6, 2016

(65) Prior Publication Data

US 2017/0190427 A1    Jul. 6, 2017

(51) Int. Cl.
*B64D 13/06* (2006.01)

(52) U.S. Cl.
CPC ...... *B64D 13/06* (2013.01); *B64D 2013/0618* (2013.01)

(58) Field of Classification Search
CPC ........... F16L 41/086; B64D 2013/0618; F04D 29/703; F02C 7/055; B04C 3/06; B04C 2003/003

USPC ........................................ 165/67; 285/16, 17
See application file for complete search history.

(56) References Cited

U.S. PATENT DOCUMENTS

| | | | |
|---|---|---|---|
| 2014/0048229 A1 | 2/2014 | Cuthbert | |
| 2014/0169944 A1* | 6/2014 | Milan | F04D 25/06 415/121.2 |
| 2014/0202121 A1* | 7/2014 | Beers | F04D 29/701 55/306 |
| 2015/0276331 A1* | 10/2015 | DeLugan | F28F 9/02 165/177 |
| 2018/0169669 A1* | 6/2018 | Himmelmann | B64D 13/00 |

\* cited by examiner

*Primary Examiner* — David Bochna
(74) *Attorney, Agent, or Firm* — Kinney & Lange, P.A.

(57) ABSTRACT

A flow duct able to be connected to a ram outlet header includes a band having an annular shape and a glove connected to the band. The glove can include a first end that is annular in shape and connected to the band, a body that is curved and has a substantially U-shaped cross section with a first opening, and a second end that has a substantially U-shaped cross section and a second opening that is an extension of the first opening.

18 Claims, 5 Drawing Sheets

FLOW DUCT FOR A RAM OUTLET HEADER

BACKGROUND

The present disclosure relates to aircraft environmental control systems. More specifically, the present disclosure relates to channeling the flow of air to a ram outlet header of a cabin air conditioning and temperature control system (CACTCS) pack.

Air cycle machines are used in environmental control systems in aircraft to condition air for delivery to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Air is drawn into the environmental control system through a ram air inlet header and heat exchangers to a ram outlet header, a fan, and a ram air outlet. Compressing ambient air at flight altitude heats the resulting pressured air sufficiently that it must be cooled, even if the ambient air temperature is very low. Thus, under most conditions, heat must be removed from air by the air cycle machine before the air is delivered to the aircraft cabin.

SUMMARY

A flow duct able to be connected to a ram outlet header includes a band having an annular shape and a glove connected to the band. The glove can include a first end that is annular in shape and connected to the band, a body that is curved and has a substantially U-shaped cross section with a first opening, and a second end that has a substantially U-shaped cross section and a second opening that is an extension of the first opening.

A system includes a ram outlet header having, a base, a first side, a second side, and a ram outlet header inlet adjacent to the first side. The system also includes a flow duct connected to the ram outlet header inlet that has a band that is substantially cylindrical in shape with a band outlet and a band inlet, a housing connecting the band outlet to the ram outlet header inlet with the housing having a housing inlet that is substantially cylindrical in shape and adjacent to the band outlet, a body that is curved and has a substantially U-shaped cross section adjacent to the first side of the ram outlet header, and a housing outlet that has a substantially U-shaped cross section adjacent to the ram outlet header inlet.

The present summary is provided only by way of example and not limitation. Other aspects of the present disclosure will be appreciated in view of the entirety of the disclosure, including the entire text, claims, and accompanying figures.

Figure 1A:
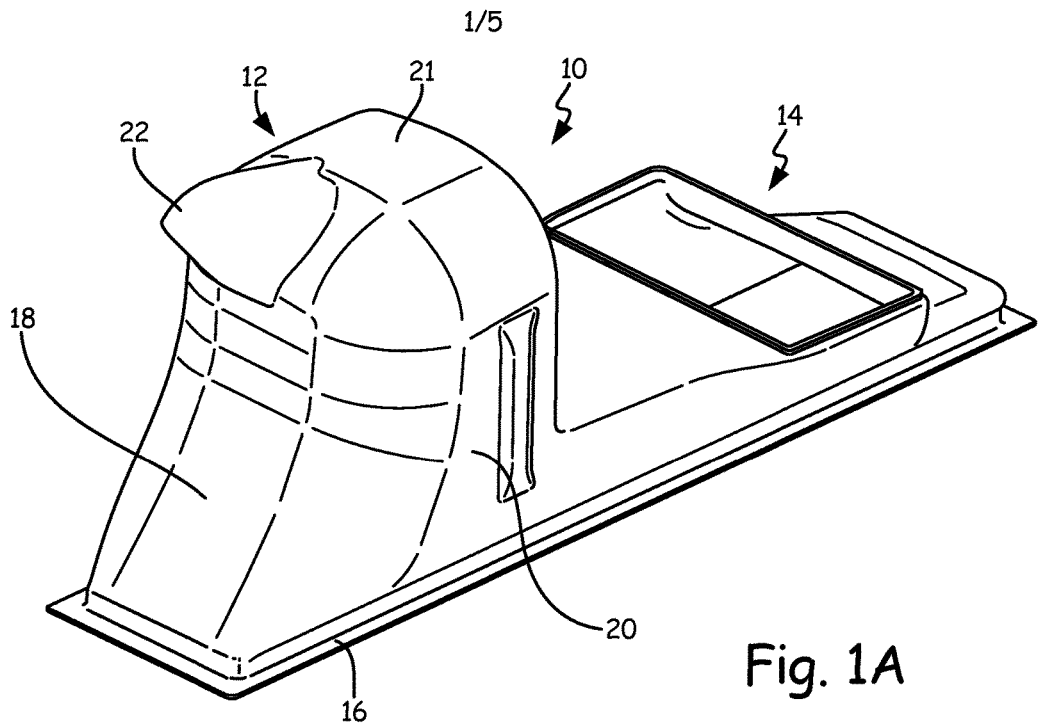
FIG. 1A is a perspective view of a ram outlet header.

While the above-identified figures set forth embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A flow duct that connects a valve or another component to a ram outlet header is disclosed herein that includes a band with an annular shape adjacent to the valve or other component and a glove that connects the band to the ram outlet header. The glove has a curved shape that minimizes the pressure drop of the air flowing through the flow duct while maintaining structural integrity with a light-weight design. The flow duct is shaped to fit within the limited space adjacent to the ram outlet header with the glove having a substantially U-shaped cross section that utilizes a first side of the ram outlet header as a wall to enclose the flow path. As will be described below and can be seen in FIG. 3A, the band and a first end of the glove are laterally offset from the ram outlet header and the rest of the flow duct to more efficiently and effectively channel air to the ram outlet header.

Figure 1B:
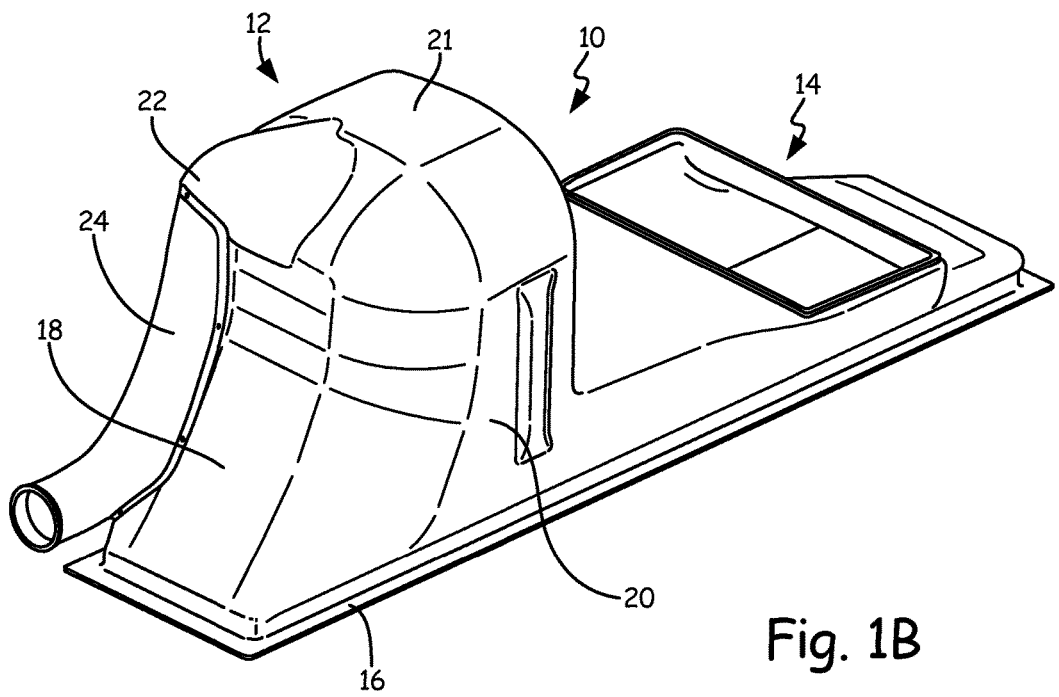
FIG. 1B is a perspective view of the ram outlet header of claim 1A with a flow duct.

FIG. 1A is a perspective view of a ram outlet header, while FIG. 1B is a perspective view of the ram outlet header of FIG. 1A with a flow duct. Ram outlet header 10 includes front section 12, rear section 14, and base 16. Front section 12 includes first side 18, second side 20, and top 21 with first side 18 having ram outlet header inlet 22. Connected to first side 18 and ram outlet header inlet 22 is flow duct 24.

Ram outlet header 10 aids in conditioning air as part of the CACTCS pack. Front section 12 channels ram air to a ram air fan, which is usually partially located within front section 12 and sits atop rear section 14. Rear section 14, along with base 16, supports the ram air fan. First side 18 is curved from base 16 towards top 21 to reduce the size of ram outlet header 10 and to efficiently and effectively channel air to the ram air fan. Second side 20 is a wall that is distant from ram outlet header inlet 22 and flow duct 24. Second side 20 is one of several components that enclose front section 12. On first side 18 is ram outlet header inlet 22, which can be an orifice or a hood that allows ram air to enter ram outlet header 10 from flow duct 24. Ram outlet header inlet 22 can be located anywhere along first side 18, but is shown in FIGS. 1A and 1B off center on first side 18 further from second side 20 than a third side (not shown) and near the top of ram outlet header 10 so that flow duct 24 can channel ram air from a valve or another component upstream to ram outlet header 10. As shown in FIG. 1A, ram outlet header inlet 22 is a hood that projects out from first side 18 to connect to flow duct 24 (as shown in FIG. 1B). Ram outlet header 10 can be constructed from a variety of materials suited to be lightweight while also providing sufficient strength and rigidity to support the ram air fan and other components within the CACTCS pack. One of ordinary skill in the art is familiar with the configuration and functionality of ram outlet header 10.

Flow duct 24 channels ram air from a valve or another component upstream (not shown) to ram outlet header inlet 22 of ram outlet header 10. Flow duct 24 can have a variety of sizes and orientations, but flow duct 24 as utilized with ram outlet header 10 is sized and oriented to efficiently and effectively channel ram air by reducing the pressure drop through flow duct 24. Flow duct 24 can be constructed from a variety of materials, but the weight of flow duct 24 and the ability to handle a wide range of temperatures of ram air should be taken into consideration when selecting a material or combination or materials. Flow duct 24 is connected to ram outlet header 10 and can be connected in a variety of ways, including through welds, bonds, rivets or other fasteners, or other means. As will be described with regards to subsequent figures, flow duct 24 is shaped to coincide with the shape of first side 18 so that a first side 18 provides a wall to completely enclose a flow path of ram air.

Figure 2A:
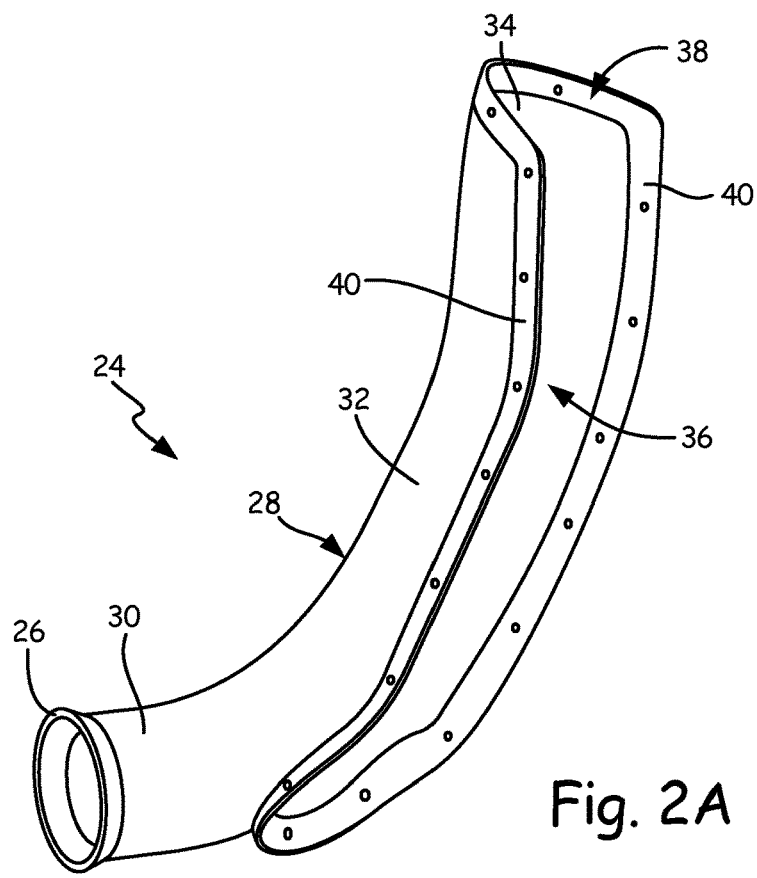
FIG. 2A is a perspective view of the flow duct.
Figure 2B:
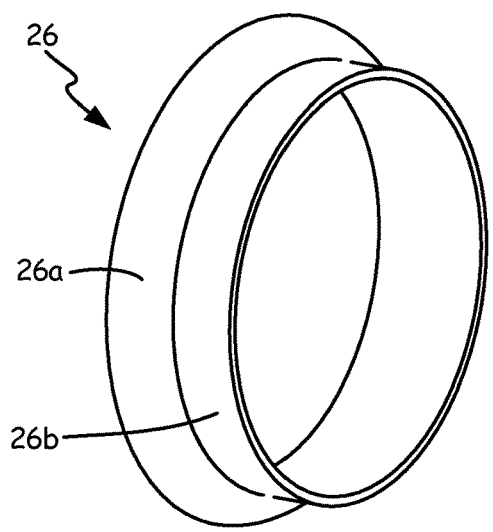
FIG. 2B is a perspective view of a band.

FIG. 2A is a perspective view of flow duct 24 of FIGS. 1A and 1B, while FIG. 2B is a perspective view of a band of flow duct 24. Flow duct 24 includes band 26 and glove 28 (also referred to as a housing). Glove 28 includes first end 30 (also referred to as a housing inlet), body 32, second end 34 (also referred to as a housing outlet), first opening 36, second opening 38, and flange 40.

Band 26 has an annular shape that connects a valve or another component to glove 28 to create a smooth flow path between adjacent components. Band 26 includes band inlet 26a and band outlet 26b. Band 26 can be constructed from a variety of materials, including plastic, PVC, a composite material, or metal (such as aluminum). The material should be suited to provide sufficient strength and able to handle the differing temperatures of ram air flowing through band 26. Additionally, the material of band 26 should be suited to connect to the upstream component and to glove 28 without becoming cracked or otherwise damaged. Band 26 can be constructed from a material that minimizes thermal expansion or that expands when experiencing elevated temperature to more completely seal the flow path.

Band 26 includes band inlet 26a, which is adjacent to the valve or another component providing ram air, and band outlet 26b, which is adjacent to glove 28 downstream from band inlet 26a. Band inlet 26a and band outlet 26b can have equal diameters or, as shown in FIG. 2B, band inlet 26a can have a diameter that is larger than a diameter of band outlet 26b so that a transition area between band inlet 26a and band outlet 26b exists. The transition area can be a stair-stepped configuration or a smooth transition where band 26 has a truncated cone shape. Band outlet 26b is sized and configured to fit within first end 30 of glove 28 and can include holes or other means to allow band 26 to be attached to glove 28, such as holes for rivets around a circumference. The length of band inlet 26a and band outlet 26b can be designed to channel ram air from the upstream component to glove 28 while providing sufficient strength, rigidity, and attachment to the upstream component and glove 28.

Glove 28 is the main structural component of flow duct 24 and channels ram air from band 26 to ram outlet header inlet 22. Glove 28 is sized and oriented to efficiently and effectively channel ram air by reducing the pressure drop through glove 28 and flow duct 24. Glove 28 is also sized and oriented to be light-weight and fit within the limited space adjacent to ram outlet header 10. Glove 28 can be constructed from a variety of materials, including plastic, PVC, metal (such as aluminum), or a composite (such as a carbon fiber laminate impregnated with bismaleimide (BMI)). The material should be suited to provide sufficient strength and able to handle the differing temperatures of ram air flowing through glove 28. Additionally, the material of glove 28 should be suited to fully and properly connect to band 26, first side 18, and ram outlet header inlet 22 without becoming cracked or otherwise damaged. Glove 28 can be constructed from a material that minimizes thermal expansion.

Glove 28 includes first end 30, body 32, second end 34, first opening 36, second opening 38, and flange 40, all of which may be one continuous and monolithic component or separate components fastened or otherwise connected to one another. Glove 28 is curved between first end 30 and second end 34 to follow the shape of first side 18 of ram outlet header 10. The curve of glove 28 may result in first end 30 being oriented 90 degrees or more from second end 34.

First end 30 is adjacent to band 26 and is substantially annular in shape. First end 30 transitions flow duct 24 from the tubular/cylindrical cross section of band 26 to the U-shaped cross section (with a wall being formed by first side 18 of ram outlet header 10) of glove 28 downstream from first end 30. First end 30 can connect to band 26 through a variety of means, but the disclosed embodiment shows band 26 connected to first end 30 by rivets. Additionally, a portion of first end 30 is shown as being radially outward from band inlet 26b to form a smooth transition within the flow path, but other configurations may be considered.

Body 32 of glove 28 is between first end 30 and second end 34, is curved, and has a substantially U-shaped cross section formed by first opening 36. Surrounding first opening 36 (and second opening 38) is flange 40, which aids in attaching glove 28 to first side 18. Body 32 has a U-shaped cross section with first opening 36 to reduce the amount of material needed for glove 28 (thereby reducing weight) and provide a smooth transition from first end 30 to second end 34 and ram outlet header inlet 22. By utilizing a portion of first side 18 as a wall to enclose the flow path by enclosing first opening 36, the amount of material needed for flow duct 24 is reduced, thereby making the aircraft on which this system is located more efficient. While body 32 is shown as having a substantially U-shaped cross section, body 32 can have a variety of other shapes and configurations suited to channel ram air from band 26 to ram outlet header inlet 22, such as a V shape, a completely enclosed tubular shape that is not attached to first side 18 or does not use first side 18 as a flow path wall, or another shape for channeling ram air.

Second end 34 is adjacent to and downstream from body 32. Second end 34 has a substantially U-shaped cross section formed by second opening 38 and is connected to ram outlet header inlet 22 to completely enclose the flow path and form a smooth transition from body 32 to ram outlet header inlet 22. Second opening 38 is an extension of first opening 36 such that an opening formed is continuous, but second opening 38 designates a portion of the opening that opens into ram outlet header inlet 22, while first opening 36 designates a portion of the opening that is enclosed by first side 18. Second end 34 corresponds with ram outlet header inlet 22 to enclose the flow path and, if ram outlet header inlet 22 has a different configuration, can be sized and shaped to match ram outlet header inlet 22. Similar to body 32, second end 34 has a substantially U-shaped cross section to reduce the amount of material needed for glove 28. However, second end 34 would still need second opening 38 to provide an outlet for ram air to flow out of flow duct 24 and into ram outlet header inlet 22. While second end 34 is shown as having a substantially U-shaped cross section, second end 34 can have a variety of other shapes and configurations suited to channel ram air from band 26 to ram outlet header inlet 22, such as a V shape, a completely enclosed tubular shape that does not use first side 18 as a flow path wall, or another shape for channeling ram air. A U-shaped cross section is preferable for allowing a smooth flow path that minimizes turbulent flow while also reducing the size and weight of flow duct 24 so that flow duct 24 can fit within the limited space around ram outlet header 10 and increase the efficiency of the system.

Figure 3A:
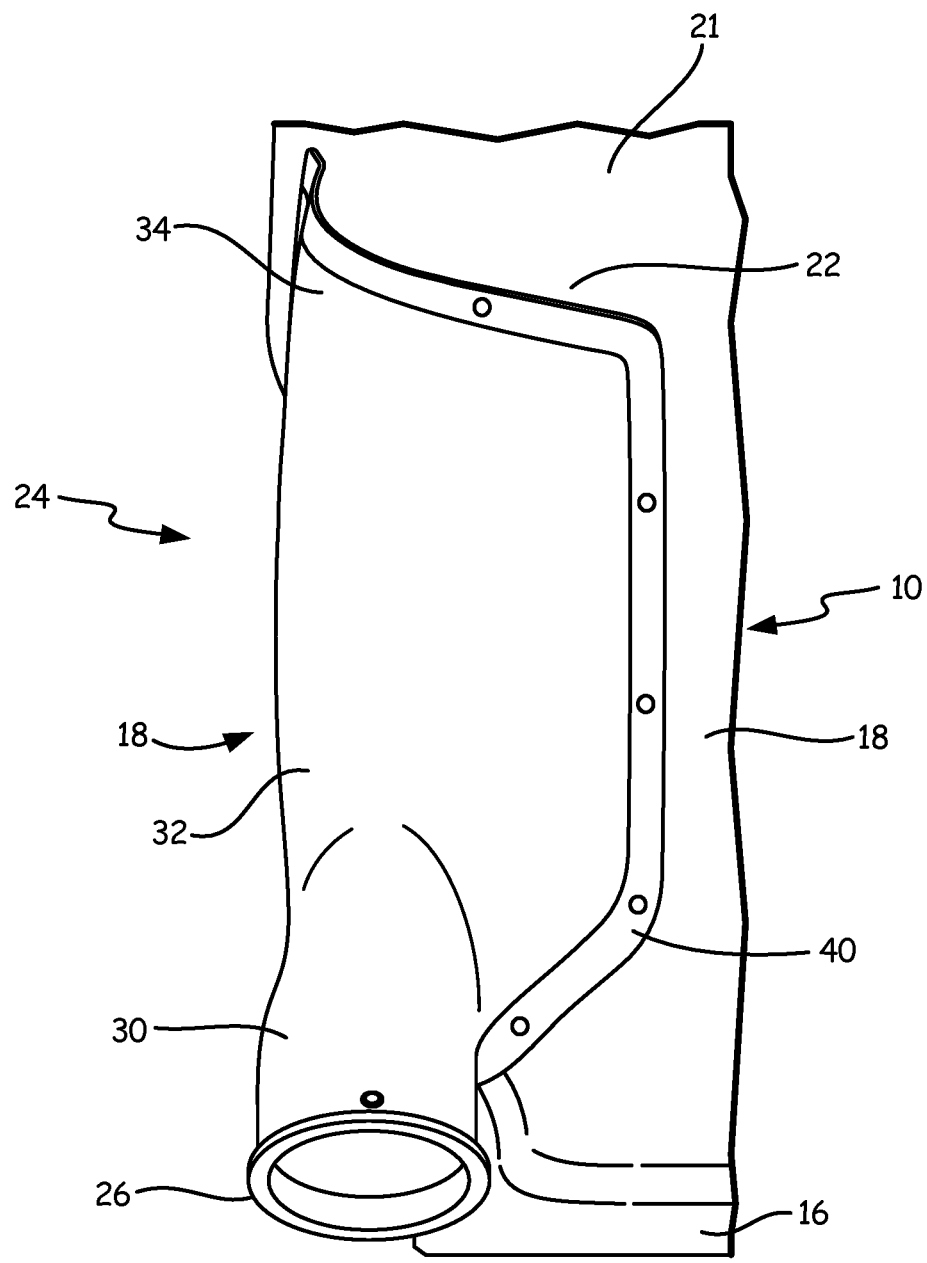
FIG. 3A is a front elevation view of the flow duct attached to the ram outlet header.
Figure 3B:
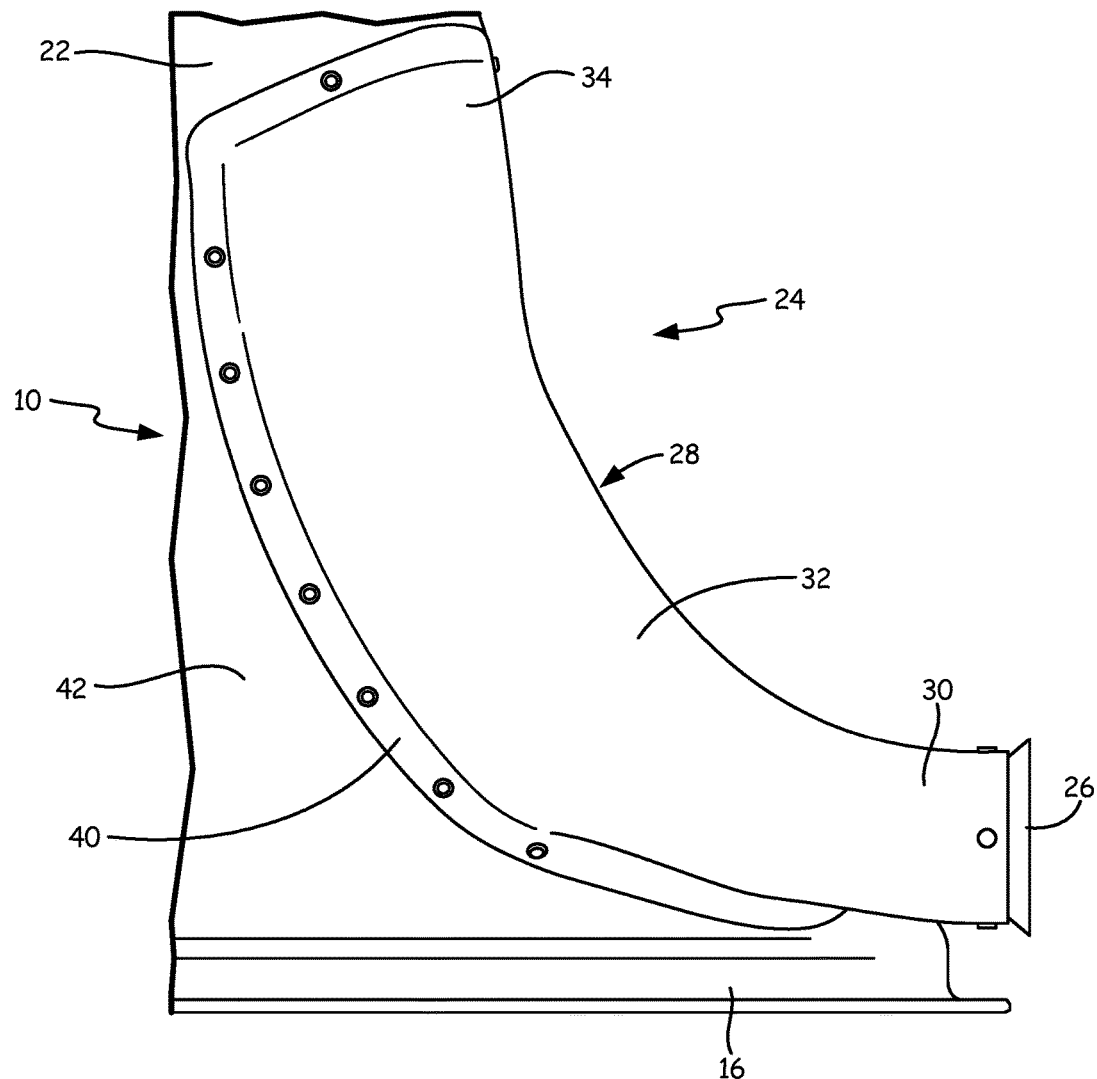
FIG. 3B is a side elevation view of the flow duct attached to the ram outlet header.

Flange 40 surrounds first opening 36 and second opening 38 to provide a surface for attaching glove 28 to first side 18 of ram outlet header 10. Flange 40 can be continuous and monolithic with glove 28 or can be a separate component or series of components. Additionally, glove 28 does not need to include flange 40 and can be attached to first side 18 by other means, such as welding an edge of body 32 and second end 34 to first side 18, or flange 40 may not completely surround first opening 36 and second opening 38. Flange 40 can attach to first side 18 through a variety of means, including welds, bonds, rivets, screws, or other fasteners. As shown in FIGS. 3A and 3B, flange 40 attaches glove 28 to first side 18 through the use of rivets.

FIG. 3A is a front elevation view of flow duct 24 attached to ram outlet header 10, and FIG. 3B is a side elevation view of flow duct 24 attached to ram outlet header 10. Ram outlet header 10 has base 16, first side 18, top 21, third side 42, and ram outlet header inlet 22. Flow duct 24 has band 26 and glove 28. Glove 28 includes first end 30, body 32, second end 34, and flange 40.

FIGS. 3A and 3B show flow duct 24 attached to first side 18 of ram outlet header 10 to form a flow path from band 26 (which can be adjacent to a valve or other component) to ram outlet header inlet 22. Flow duct 24 is sized and shaped to create a smooth flow path while fitting within the limited space around ram outlet header 10.

As seen in FIG. 3A, band 26 and first end 30 are laterally offset from ram outlet header 10, body 32, and second end 34 so that band 26 and first end 30 are laterally further from second side 20 (shown in FIGS. 1A and 1B) than body 32 and second end 34. This lateral offset allows ram air to flow more smoothly and efficiently through flow duct 24 (by reducing the formation of turbulent air/zones). Additionally, this lateral offset allows band 26 to completely connect to a valve or another component so that ram air cannot seep out of the flow path through a gap between band 26 and the upstream component.

As seen in FIG. 3B, band 26 and first end 30 extend outward away from ram outlet header 10 such that band 26 is outward from base 16. Band 26 and first end 30 extending outward allows the component upstream from band 26 (such as a valve) to be smaller and shorter because the component does not have to extend downstream as much to be adjacent to band 26, thereby reducing the weight of that component. The position of band 26 and first end 30 may also allow more room for band 26 to connect to the component upstream and more room for assembly and maintenance personnel.

Figure 4A:
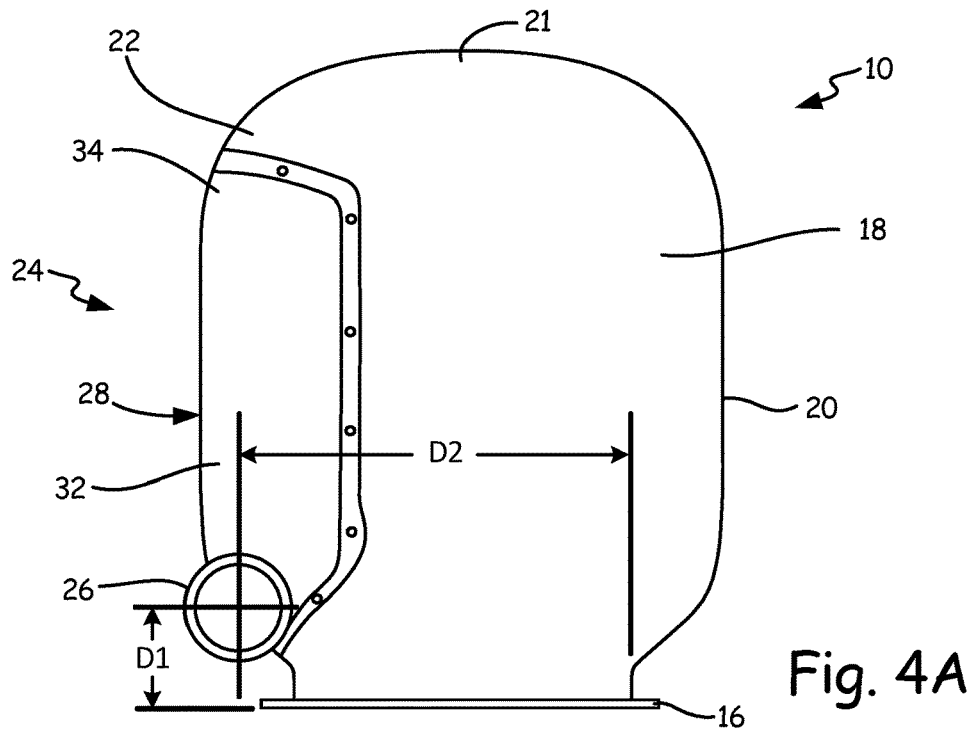
FIG. 4A is a front elevation view of the ram outlet header with the flow duct.
Figure 4B:
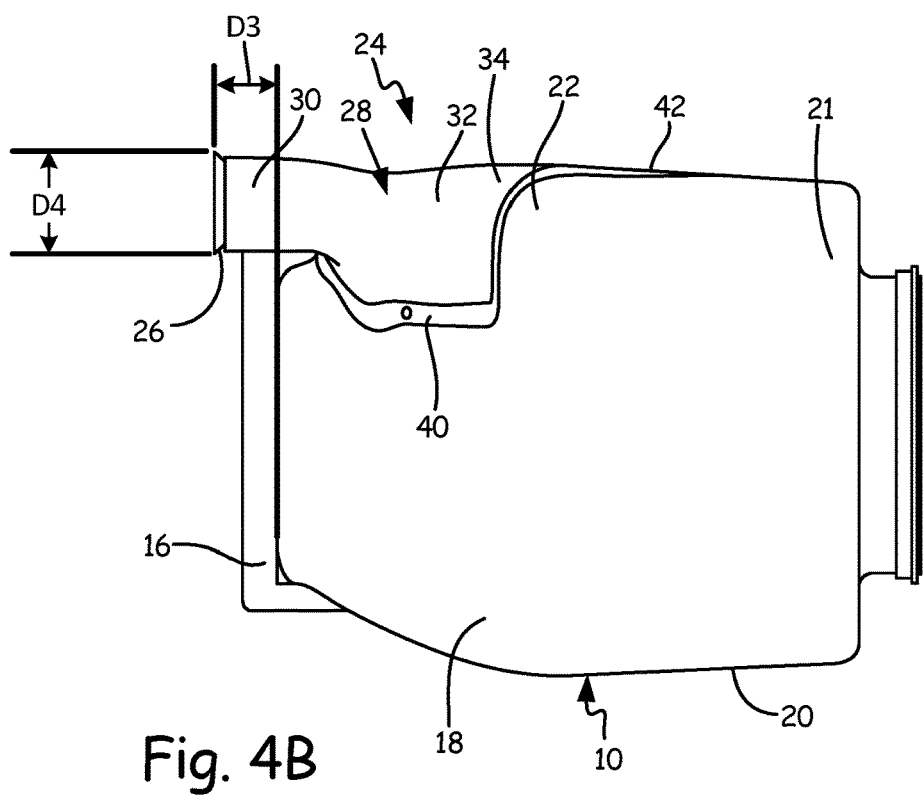
FIG. 4B is a plan view of a portion of the ram outlet header with the flow duct.

FIG. 4A is a front elevation view of ram outlet header 10 with flow duct 24, and FIG. 4B is a plan view of a portion of ram outlet header 10 with flow duct 24. Ram outlet header 10 has base 16, first side 18, top 21, third side 42, and ram outlet header inlet 22. Flow duct 24 has band 26 and glove 28. Glove 28 includes first end 30, body 32, second end 34, and flange 40.

FIGS. 4A and 4B show a first distance (D1), a second distance (D2), a third distance (D3), and a fourth distance (D4), which are helpful in describing the dimensions of flow duct 24. The first distance (D1) is from a plane formed by a bottom of base 16 to a center of band 26. The plane formed by the bottom of base 16 is along a lowest point of ram outlet header 10. The center of band 26 is the center of the circle formed by the cross section of band 26 at band inlet 26a (shown in FIG. 2B). The second distance (D2) is from a plane formed by the intersection of base 16, first side 18, and second side 20 to the center of band 26. The plane formed by the intersection of base 16, first side 18, and second side 20 is parallel to a longitudinal edge of base 16 (that runs along ram outlet header 10 from front section 12 to rear section 14) and is along a point where second side 20 angles inward to meet base 16 and a bottom of first side 18. The third distance (D3) is from a plane formed by band inlet 26a to a plane formed by the intersection of base 16 and first side 18. The plane formed by band inlet 26a is along a point where band inlet 26a is furthest from ram outlet header 10. The plane formed by the intersection of base 16 and first side 18 is parallel to a transverse edge of base 16 (that runs along ram outlet header 10 from second side 20 to third side 42) and is along a point where first side 16 curves to meet base 16. The fourth distance (D4) is an outer diameter of band outlet 26a of band 26. While design considerations may determine the values of D1, D2, D3, and D4, some nonlimiting examples are set out in Table 1:

TABLE 1

| Parameter | Min (cm) | Min (in) | Max (cm) | Max (in) |
| --- | --- | --- | --- | --- |
| D1 | 10.163 | 4.001 | 10.467 | 4.121 |
| D2 | 43.447 | 17.105 | 43.752 | 17.225 |
| D3 | 7.018 | 2.763 | 7.323 | 2.883 |
| D4 | 11.775 | 4.636 | 11.801 | 4.646 |

| Ratio | Min | Max |
| --- | --- | --- |
| D1/D2 | 0.232 | 0.241 |
| D1/D3 | 1.388 | 1.491 |
| D1/D4 | 0.861 | 0.889 |
| D2/D3 | 5.933 | 6.234 |
| D3/D4 | 0.595 | 0.622 |

As mentioned earlier, flow duct 24 connects a valve or other component upstream from flow duct 24 to ram outlet header 10. Flow duct 24 includes band 26 (with band inlet 26a and band outlet 26b) that is annular in shape and adjacent to the valve or another component. Flow duct 24 also includes glove 28 that connects band 26 to ram outlet header 10 (first side 18 and ram outlet header inlet 22). Glove 28 has a curved shape that minimizes the pressure drop of ram air flowing through flow duct 24 while maintaining structural integrity with a light-weight design. Flow duct 24 is shaped to fit within the limited space adjacent to ram outlet header 10 with glove 28 having body 32 and second end 34 with a substantially U-shaped cross section to reduce weight by utilizing first side 18 of ram outlet header 10 as a wall to enclose the flow path. Band 26 and first end 30 of glove 28 are laterally offset from ram outlet header 10 and the rest of flow duct 24 to more efficiently and effectively channel ram air to ram outlet header 10. Additionally, band 26 and first end 30 extend outward away from ram outlet header 10 to connect to the valve or another component.

DISCUSSION OF POSSIBLE EMBODIMENTS

The following are non-exclusive descriptions of possible embodiments of the present invention.

A flow duct able to be connected to a ram outlet header includes a band having an annular shape and a glove connected to the band. The glove can include a first end that is annular in shape and connected to the band, a body that is curved and has a substantially U-shaped cross section with a first opening, and a second end that has a substantially U-shaped cross section and a second opening that is an extension of the first opening.

The flow duct of the preceding paragraph can optionally include, additionally and/or alternatively, any one or more of the following features, configurations, and/or additional components:

A flange adjacent to the first opening and the second opening that is configured to allow the glove to connect to the ram outlet header.

A portion of the band fits within a portion of the first end.

An outer diameter of the band is between approximately 11.76 centimeters (4.63 inches) and approximately 11.81 centimeters (4.65 inches).

The glove is constructed from a carbon fiber laminate material.

The band is connected to the glove by rivets.

The body of the glove curves so that the first end and the second end are oriented at least 90 degrees from one another.

A system includes a ram outlet header having, a base, a first side, a second side, and a ram outlet header inlet adjacent to the first side. The system also includes a flow duct connected to the ram outlet header inlet that has a band that is substantially cylindrical in shape with a band outlet and a band inlet, a housing connecting the band outlet to the ram outlet header inlet with the housing having a housing inlet that is substantially cylindrical in shape and adjacent to the band outlet, a body that is curved and has a substantially U-shaped cross section adjacent to the first side of the ram outlet header, and a housing outlet that has a substantially U-shaped cross section adjacent to the ram outlet header inlet.

The system of the preceding paragraph can optionally include, additionally and/or alternatively, any one or more of the following features, configurations, and/or additional components:

The band inlet has a diameter that is larger than a diameter of the band outlet.

A ratio of a first distance from a plane formed by a bottom of the base to a center of the band inlet to a second distance from a plane formed by the intersection of the first side, the second side, and the base to the center of the band inlet is between approximately 0.232 and approximately 0.241.

A ratio of a first distance from a plane formed by a bottom of the base to a center of the band inlet to a third distance from a plane formed by band inlet to a plane formed by the intersection of the first side and the base is between approximately 1.388 and approximately 1.491.

A ratio of a first distance from a plane formed by a bottom of the base to a center of the band inlet to a fourth distance that is an outer diameter of the band inlet is between approximately 0.861 and approximately 0.889.

A ratio a second distance from a plane formed by the intersection of the first side, the second side, and the base to the center of the band inlet to a third distance from a plane formed by the band inlet to a plane formed by the intersection of the first side and the base is between approximately 5.933 to approximately 6.234.

A ratio of a third distance from a plane formed by the band inlet to a plane formed by the intersection of the first side and the base to a fourth distance that is an outer diameter of the band inlet is between approximately 0.595 and approximately 0.622.

A flange adjacent to the body and the housing outlet that is configured to allow the housing to be fastened to the ram outlet header.

The band outlet is radially within the housing inlet.

The flow duct is fastened to a first side of the ram outlet header.

The ram outlet header inlet protrudes out from the first side.

The housing inlet and the housing outlet are oriented at least 90 degrees from one another.

The housing inlet is laterally offset from the body and the housing outlet so that the housing inlet is laterally further from the second side than the body and the housing outlet.

Any relative terms or terms of degree used herein, such as "substantially," "essentially," "generally," "approximately," and the like should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations; incidental alignment variations; alignment or shape variations induced by thermal, rotational, or vibrational operational conditions; and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flow duct able to be connected to a ram outlet header comprising:
    a band having an annular shape;
    a glove connected to the band, the glove comprising:
        a first end that is annular in shape and connected to the band;
        a body that is curved and has a substantially U-shaped cross section with a first opening; and
        a second end that has a substantially U-shaped cross section and a second opening that is an extension of the first opening,
    wherein a portion of the band fits within a portion of the first end.

2. The flow duct of claim 1, further comprising:
    a flange adjacent to the first opening and the second opening that is configured to allow the glove to connect to the ram outlet header.

3. The flow duct of claim 1, wherein an outer diameter of the band is between approximately 11.76 centimeters (4.63 inches) and approximately 11.81 centimeters (4.65 inches).

4. The flow duct of claim 1, wherein the glove is constructed from a carbon fiber laminate material.

5. The flow duct of claim 1, wherein the band is connected to the glove by rivets.

6. The flow duct of claim 1, wherein the body of the glove curves so that the first end and the second end are oriented at least 90 degrees from one another.

7. A system comprising:
- a ram outlet header having, a base, a first side, a second side, and a ram outlet header inlet adjacent to and protruding out from the first side; and
- a flow duct connected to the ram outlet header inlet, the flow duct comprising:
  - a band that is substantially cylindrical in shape with a band outlet and a band inlet;
  - a housing connecting the band outlet to the ram outlet header inlet, the housing having a housing inlet that is substantially cylindrical in shape and adjacent to the band outlet, a body that is curved and has a substantially U-shaped cross section adjacent to the first side of the ram outlet header, and a housing outlet that has a substantially U-shaped cross section adjacent to the ram outlet header inlet.

8. The system of claim 7, wherein the band inlet has a diameter that is larger than a diameter of the band outlet.

9. The system of claim 7, wherein a ratio of a first distance from a plane formed by a bottom of the base to a center of the band inlet to a second distance from a plane formed by the intersection of the first side, the second side, and the base to the center of the band inlet is between approximately 0.232 and approximately 0.241.

10. The system of claim 7, wherein a ratio of a first distance from a plane formed by a bottom of the base to a center of the band inlet to a third distance from a plane formed by band inlet to a plane formed by the intersection of the first side and the base is between approximately 1.388 and approximately 1.491.

11. The system of claim 7, wherein a ratio of a first distance from a plane formed by a bottom of the base to a center of the band inlet to a fourth distance that is an outer diameter of the band inlet is between approximately 0.861 and approximately 0.889.

12. The system of claim 7, wherein a ratio of a second distance from a plane formed by the intersection of the first side, the second side, and the base to the center of the band inlet to a third distance from a plane formed by the band inlet to a plane formed by the intersection of the first side and the base is between approximately 5.933 to approximately 6.234.

13. The system of claim 7, wherein a ratio of a third distance from a plane formed by the band inlet to a plane formed by the intersection of the first side and the base to a fourth distance that is an outer diameter of the band inlet is between approximately 0.595 and approximately 0.622.

14. The system of claim 7, further comprising:
- a flange adjacent to the body and the housing outlet that is configured to allow the housing to be fastened to the ram outlet header.

15. The system of claim 7, wherein the band outlet is radially within the housing inlet.

16. The system of claim 7, wherein the flow duct is fastened to a first side of the ram outlet header.

17. The system of claim 7, wherein the housing inlet and the housing outlet are oriented at least 90 degrees from one another.

18. The system of claim 7, wherein the housing inlet is laterally offset from the body and the housing outlet so that the housing inlet is laterally further from the second side than the body and the housing outlet.

* * * * *